US008995502B1

(12) United States Patent
Lai et al.

(10) Patent No.: US 8,995,502 B1
(45) Date of Patent: Mar. 31, 2015

(54) TRANSCEIVER WITH SPECTRAL ANALYSIS

(75) Inventors: Stephen Lai, Calgary (CA); Peter Zahariev Rashev, Calgary (CA)

(73) Assignee: Apple Inc., Cupertino, CA (US)

( * ) Notice: Subject to any disclaimer, the term of this patent is extended or adjusted under 35 U.S.C. 154(b) by 1851 days.

(21) Appl. No.: 11/688,742

(22) Filed: Mar. 20, 2007

Related U.S. Application Data

(60) Provisional application No. 60/788,969, filed on Apr. 4, 2006.

(51) Int. Cl.
*H04B 1/38* (2006.01)
*H04L 5/16* (2006.01)

(52) U.S. Cl.
USPC .......................................................... 375/219

(58) Field of Classification Search
USPC .......................................................... 375/219
See application file for complete search history.

(56) References Cited

U.S. PATENT DOCUMENTS

| | | | |
|---|---|---|---|
| 4,577,334 A | 3/1986 | Boer et al. | |
| 4,717,894 A | 1/1988 | Edwards et al. | |
| 5,049,832 A | 9/1991 | Cavers | |
| 5,113,414 A | 5/1992 | Karam et al. | |
| 5,119,399 A | 6/1992 | Santos et al. | |
| 5,371,481 A | 12/1994 | Tiittanen et al. | |
| 5,524,285 A | 6/1996 | Wray et al. | |
| 5,613,226 A | 3/1997 | Kanami | |
| 5,732,333 A | 3/1998 | Cox et al. | |
| 5,740,520 A | 4/1998 | Cyze et al. | |
| 5,786,728 A | 7/1998 | Alinikula | |
| 5,990,738 A | 11/1999 | Wright et al. | |
| 6,133,789 A | 10/2000 | Braithwaite | |
| 6,147,553 A | 11/2000 | Kolanek | |
| 6,169,463 B1 | 1/2001 | Mohindra et al. | |
| 6,194,964 B1 | 2/2001 | Jun | |
| 6,208,698 B1 | 3/2001 | Marchesani et al. | |
| 6,266,517 B1 | 7/2001 | Fitzpatrick et al. | |
| 6,275,685 B1 * | 8/2001 | Wessel et al. | 455/126 |
| 6,298,096 B1 | 10/2001 | Burgin | |
| 6,600,792 B2 * | 7/2003 | Antonio et al. | 375/297 |
| 7,085,315 B1 * | 8/2006 | Kelton | 375/219 |
| 7,085,330 B1 | 8/2006 | Shirali | |
| 2001/0007435 A1 * | 7/2001 | Ode et al. | 330/149 |
| 2001/0022532 A1 | 9/2001 | Dolman | |
| 2002/0181611 A1 | 12/2002 | Kim | |
| 2003/0146791 A1 | 8/2003 | Shvarts et al. | |
| 2005/0017801 A1 * | 1/2005 | Bachman et al. | 330/149 |
| 2005/0025265 A1 * | 2/2005 | D'Amico et al. | 375/346 |
| 2005/0180527 A1 * | 8/2005 | Suzuki et al. | 375/297 |
| 2006/0209984 A1 * | 9/2006 | Kenington | 375/297 |

OTHER PUBLICATIONS

Faulkner, M., et al., "Amplifier Linearisation Using RF Feedback and Feedforward Techniques", *Proceedings of the IEEE Vehicular Technology Conference*, Chicago, IL,(Jul. 25, 1995),525-529.

(Continued)

*Primary Examiner* — Tanmay Shah
(74) *Attorney, Agent, or Firm* — Meyertons, Hood, Kivlin, Kowert & Goetzel, P.C.

(57) ABSTRACT

A transceiver for a cellular telephone network includes a transmitter and a receiver that receives transmitted signals, as well as a receiver. A spectral analyzer analyzes the received signals and a controller coupled to the spectral analyzer controls the transmitter and receiver as a function of the spectral analyzer analysis.

12 Claims, 6 Drawing Sheets

(56) References Cited

OTHER PUBLICATIONS

Jones, A. E., et al., "Phase error correcting vector modulator for personal communications network(PCN) transceivers", *Electronics Letters*, 27(14), (Jul. 4, 1991),1230-1231.

Lohtia, A., et al., "Power Amplifier Linearization Using Cubic Spline Interpolation", *IEEE Vehicular Technology Conference*, (May 18-20, 1993),676-679.

Sano, A., et al., "Identification of Hammerstein-Wiener System with Application to Compensation for Nonlinear Distortion", *SICE 2002; Proceedings of the 41st SICE Annual Conference*; vol. 3, (Aug. 5-7, 2002),1521-1526.

* cited by examiner

TRANSCEIVER WITH SPECTRAL ANALYSIS

RELATED APPLICATION

This application claims the benefit of U.S. Provisional Application Ser. No. 60/788,969 (entitled TRANSCEIVER OPTIMIZATION UTILIZING DIGITAL SPECTRUM ANALYZER, filed Apr. 4, 2006) which is incorporated herein by reference.

BACKGROUND

Transceivers, such as transceivers in cellular base stations and other devices that transmit electromagnetic signals contain transmitters that amplify and transmit input signals. Amplification on an input signal is performed with a power amplifier. Power amplifiers are generally non-linear for different frequency signals. In other words, they may amplify signals at different frequencies or amplitudes with different gain. To help solve this problem, the input signal may be pre-distorted if the non-linear gain of the power amplifier is known. This helps ensure that that the output of the power amplifier is generally linear. Te effectively provide transmit signal predistortion, the output signal of a transmitter power amplifier may be fed back to the transceiver using a feedback or observation receiver. Besides feedback receivers, the transceiver may comprise main signal receivers connected to antennas. Any of the receivers may be subjected to unwanted interferences or performance degradations due to internal or external hardware impacting factors.

In some instances, the gain of the power amplifier may vary further under different operating conditions, such as different temperatures. The pre-distorted input signal may not be able to account for changing performance of the power amplifier. In some cases, the power amplifier may be inefficient and may also be over specified to ensure sufficient broadcasting power to obtain desired coverage. During operation, some of the following receiver parameters can adversely affect the transceiver usage: Noise-floor, spurious emissions, selectivity, or nonlinearity. The main receivers may also impair the network-level performance of a given transceiver being a part of a cellular base station in terms of cell-radius (sensitivity) and/or link capacity due to increased receiver noise-floor or interference at the receiver input.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein are implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wireless transmissions. Further, such functions correspond to modules, which are software, hardware, firmware or any combination thereof. Multiple functions are performed in one or more modules as desired, and the embodiments described are merely examples. The software may be executed on a digital signal processor, FPGA, ASIC, microprocessor, or other type of processor operating on a computer system, such as a personal computer, server or other computer system.

Several embodiments are described, including the use of a digital spectrum analyzer to improve performance and increase efficiency of a signal transceiver system. The digital spectrum analyzer provides a spectral analysis of signals within a system, which in one embodiment are used to improve transceiver efficiency and avoid over-specification.

Figure 1:
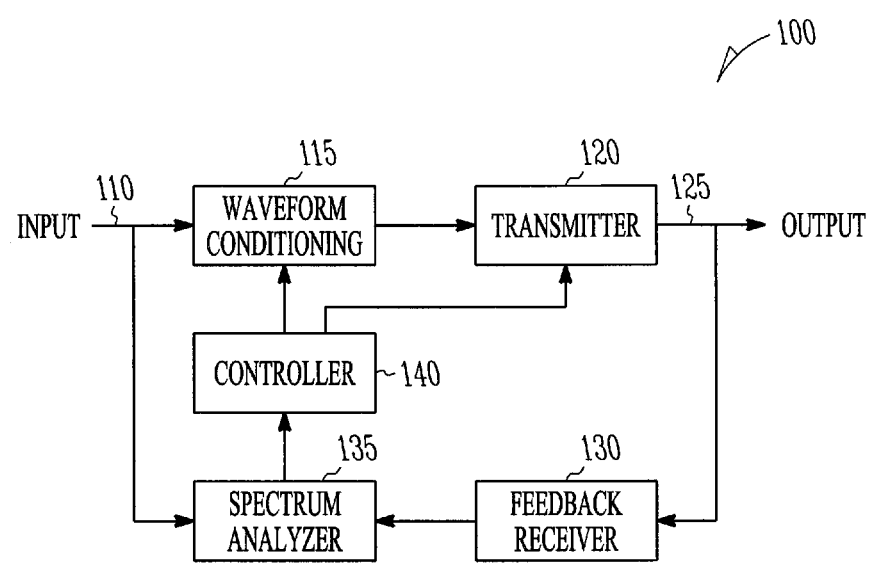
FIG. 1 is a block diagram of a transceiver system with a spectrum analyzer according to an example embodiment.

A digital spectrum analyzer can be used to improve performance and increase efficiency of a signal transceiver system 100 as shown in FIG. 1. System 100 is shown in simplified block diagram form. A digital input signal of signals to be transmitted is provided to a waveform conditioning module 115. The waveform conditioning module 115 pre-distorts the input signal and provides it to a transmitter 120. The pre-distortion is performed to at least partially account for non-linearity of the transmitter, such as a power amplifier. In other words the signal provided to the transmitter 120 is predistorted to help ensure that an output signal 125 provided by the transmitter 120 is closer to that desired for a given input signal given an imperfect transmitter.

In one embodiment, the output signal is received by a feedback receiver 130, and provided to a spectrum analyzer 135. Spectrum analyzer 135 also receives the input signal 110 in one embodiment, and compares the two signals to generate information about the spectral power of the two signals. The information is provided to a controller 140, which may be coupled to the waveform conditioning module 115 for further predistortion of the input signal, and may also be coupled to the transmitter to provide gain control and/or power supply voltage control to ensure that signals are properly amplified by the transmitter.

Figure 2:
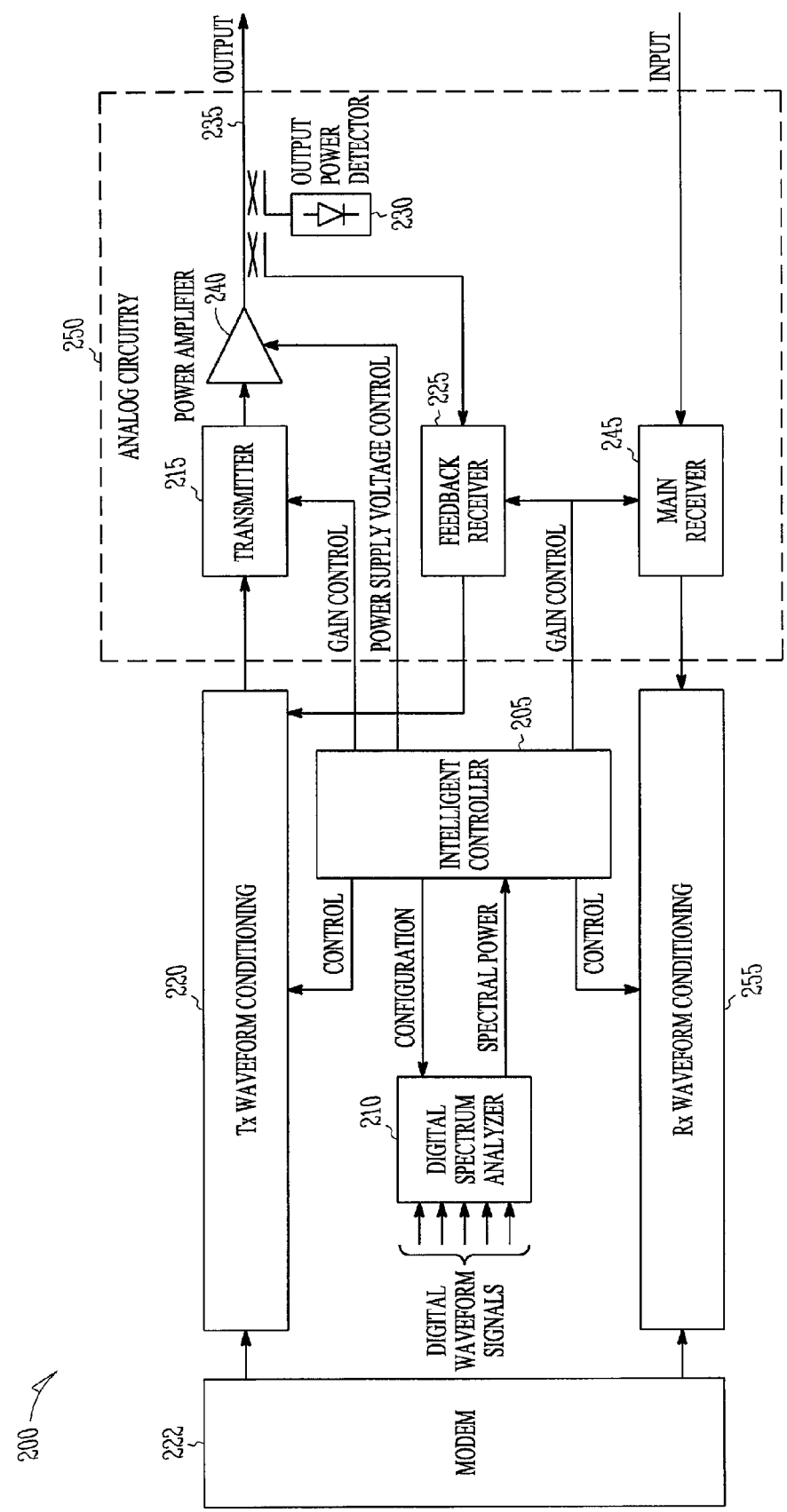
FIG. 2 is a detailed block diagram of a transceiver system with a spectrum analyzer according to an example embodiment.

Further detail of a signal transceiver system is shown at 200 in FIG. 2. In one embodiment, an intelligent controller 205 may be used in conjunction with a digital spectrum analyzer 210 to increase transmitter 215 efficiency and reduce unwanted spectral emissions by adjusting certain controls within digital signal generation and conditioning circuitry 220 that receives an input signal from a modem 222. Specifically, spectral analysis measurements can be used to adjust controls in peak-envelope reduction and digital pre-distortion functional blocks within the transmit waveform conditioner 220.

In transmitter architectures that employ feedback or "observation" receivers 225, the digital spectrum analyzer can also be used with an optional analog power detector 230 to provide accurate measurements of absolute and relative spectral emissions at the output 235. These measurements can be used by the intelligent controller 205 to increase transmitter 215 efficiency by reducing the power supply voltage to a power amplifier 240 until spectral emissions reach a maximum limit. Over-specification of the power amplifier (due to output power detector inaccuracy and erring on the side of higher power) can also be avoided by measuring spectral emissions and reducing transmitter gain only if spectral emissions are above maximum limits.

In a main receiver 245, the digital spectrum analyzer 210 can be used on signals within a receive waveform conditioner 255 to measure the performance of the analog hardware indicated by broken line 250. In particular, the spectrum analyzer 210 can be used to measure: (1) noise-floor, (2) spurious emissions, (3) selectivity, and (4) nonlinearity of the analog receiver. As well, the spectrum analyzer can be used to perform network-level performance measurements of the receive communication link such as: (1) estimation of sensitivity and capacity limits due to receiver noise-floor, and (2) detection of interferers at the receiver input.

Figure 3:
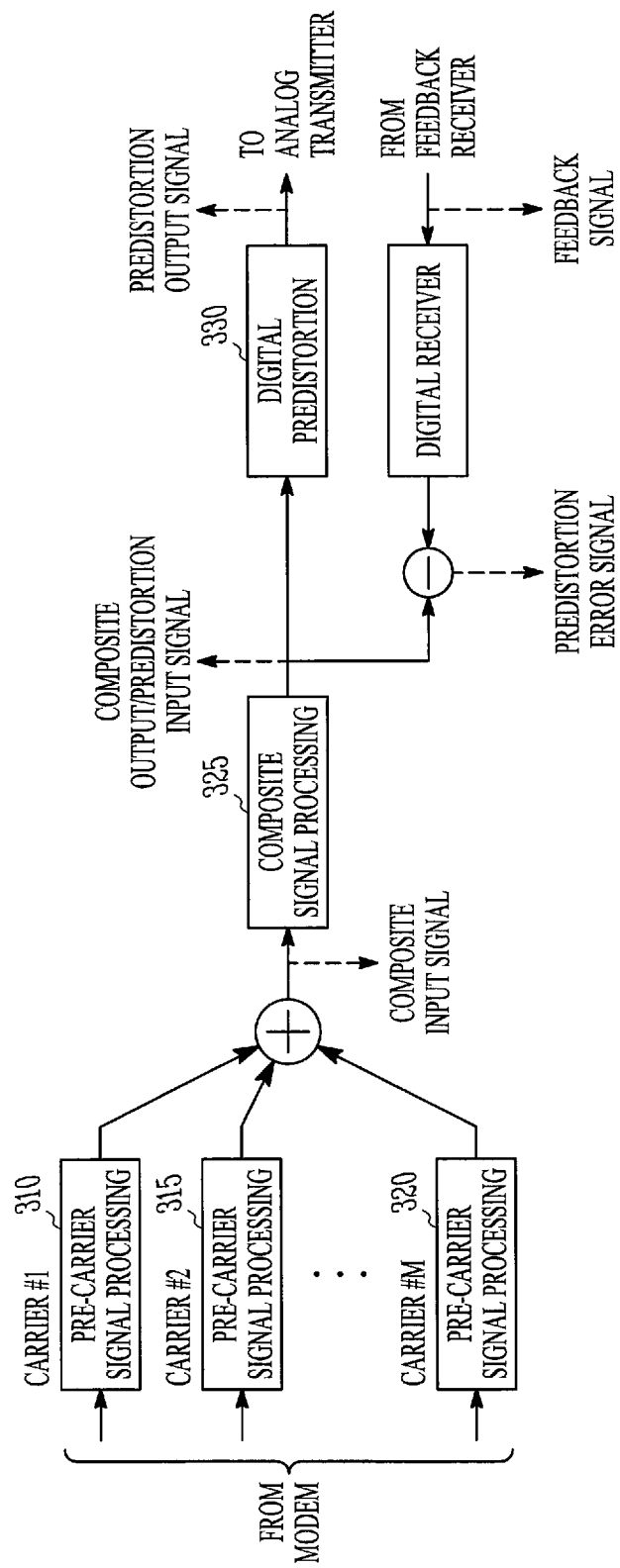
FIG. 3 is a block diagram of a transmitter section portion of a transceiver system according to an example embodiment.
Figure 4:
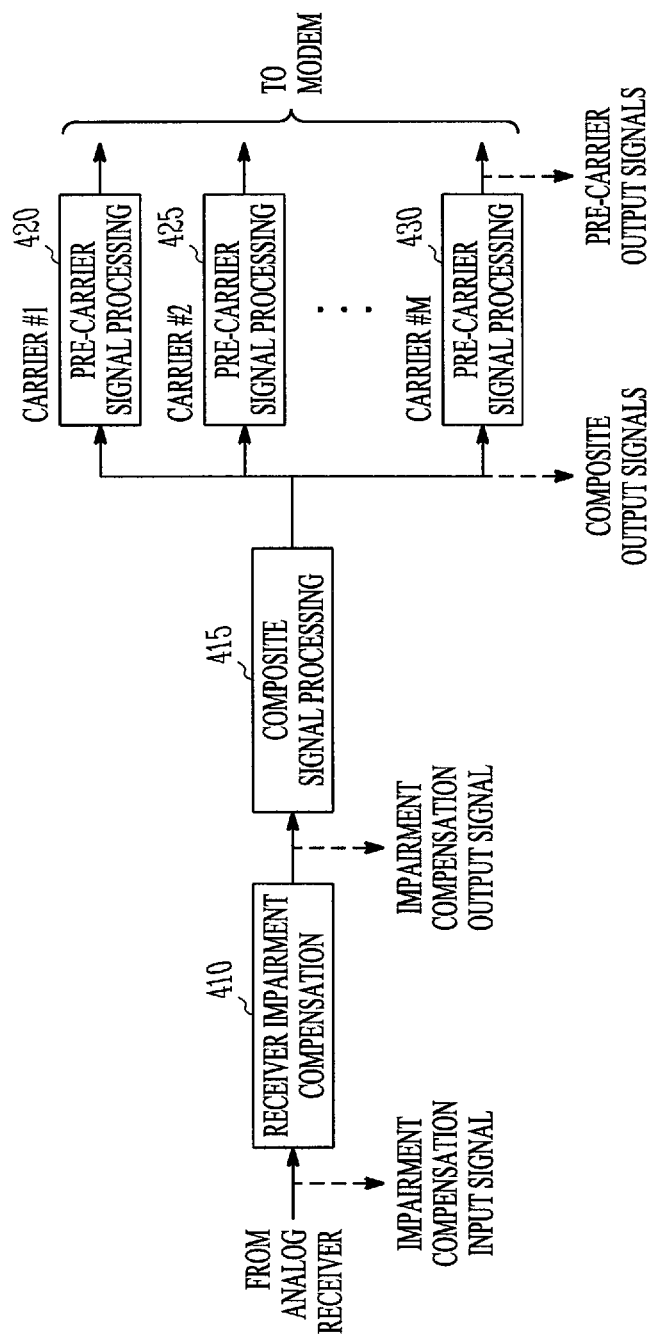
FIG. 4 is a detailed block diagram of a main receiver section of a transceiver system according to an example embodiment.
Figure 5:
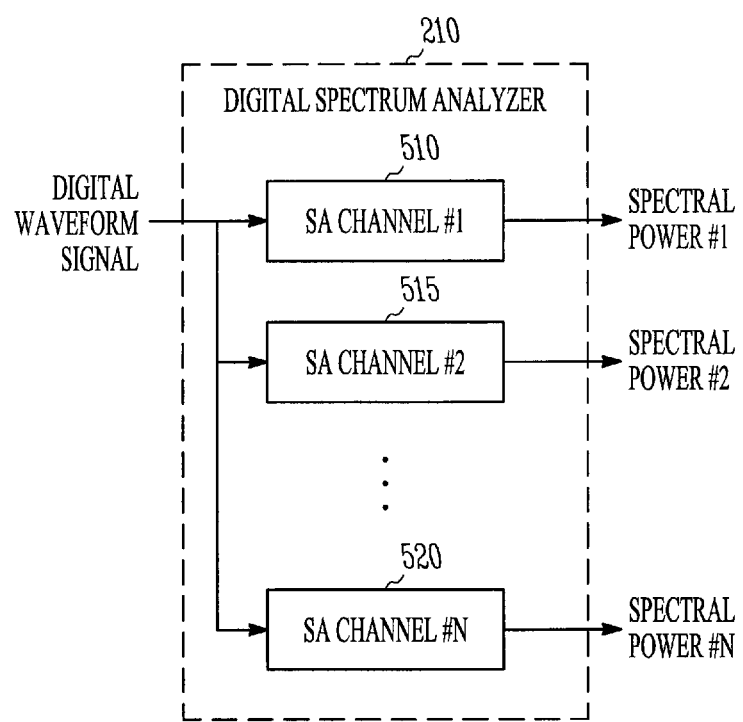
FIG. 5 is a block diagram of a digital spectrum analyzer for a transceiver system according to an example embodiment.
Figure 6:
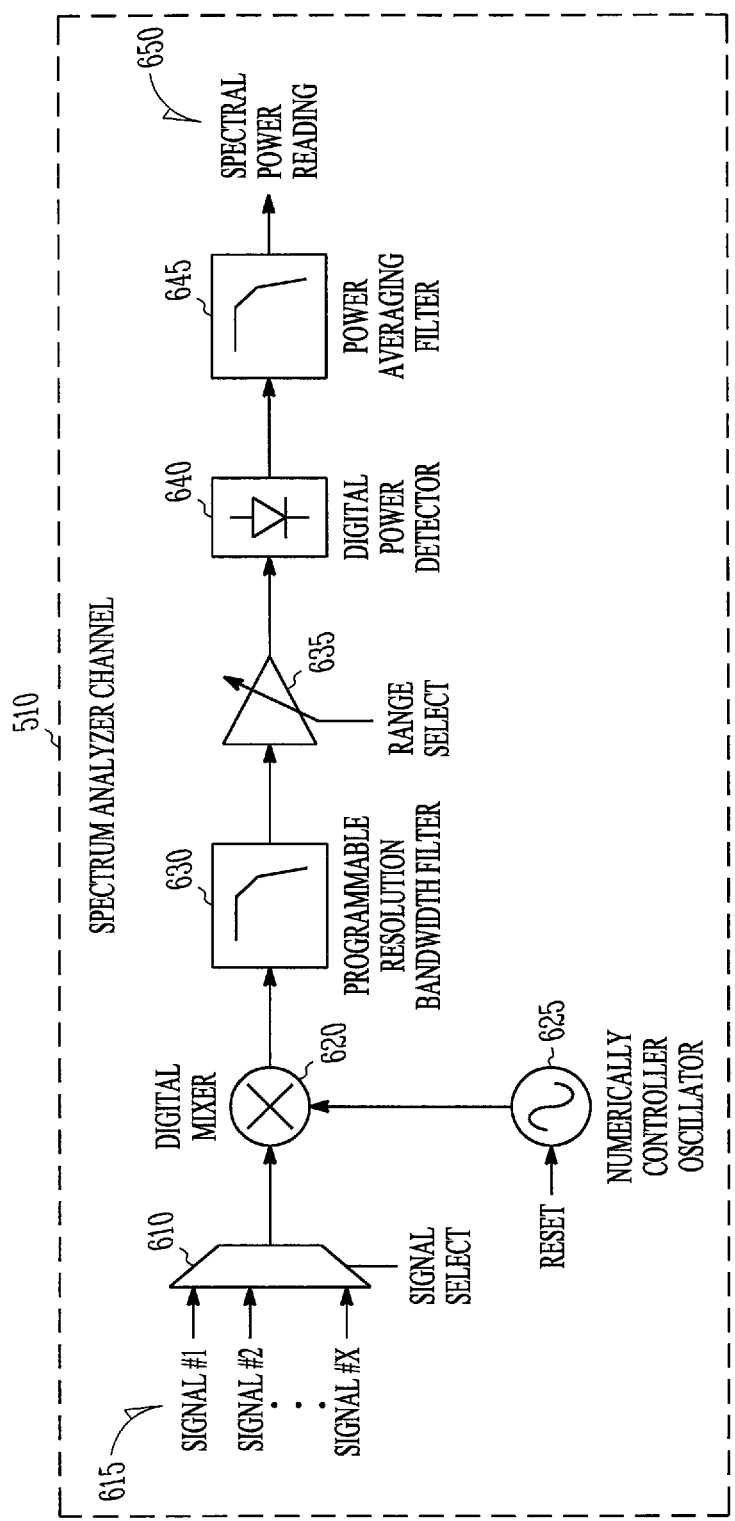
FIG. 6 is a block diagram of a spectrum analyzer channel for a transceiver system according to an example embodiment.

Transmit waveform conditioner 220 contains blocks which perform per-carrier, composite (multi-carrier), and pre-distortion digital signal processing as shown in FIG. 3. Per-carrier signal processing blocks 310, 315 and 320 may perform functions such as rate-changing, filtering, gain control, and frequency translation. While only three such per-carrier signal processing blocks are shown, there may be many more if more than three carriers are present. A composite signal processing block 325 may perform functions such as rate-changing, peak-power reduction, filtering, and gain control. A digital pre-distortion block 330 contains algorithms for performing the inverse of the power amplifier nonlinear distortion characteristic. To improve transmitter performance and efficiency, the digital spectrum analyzer 210 can perform real-time spectral measurements on any digital waveform signal in the transmit waveform conditioner including the following:

Composite Signal Processing Input
Composite Signal Processing Output
Predistortion Input
Predistortion Output
Feedback Signal
Predistortion Error Signal The receive waveform conditioner 255 contains blocks which perform impairment compensation 410, composite (mulit-carrier) 415, and per-carrier digital signal processing 420, 425, 430 as shown in FIG. 4. While only three such per-carrier digital signal processing blocks are shown, there may be many more if more than three carriers are present. The impairment compensation signal processing block 410 may compensate for analog receiver impairments such as IQ imbalance, DC offset, and nonlinearity. The composite signal processing block 415 may perform functions such as filtering, rate-changing, and gain control. The per-carrier signal processing block 420, 425, 430 may perform functions such as frequency translation, filtering, rate-changing and gain control. To improve receiver performance and efficiency, the digital spectrum analyzer 210 can perform real-time spectral measurements on any digital waveform signal in the receive waveform conditioner including the following:

Impairment Compensation Input
Impairment Compensation Output
Composite Signal Processing Output
Per-Carrier Signal Processing Outputs The intelligent controller 205 improves transmitter performance and efficiency by performing measurements using the spectrum analyzer 210 and making appropriate adjustments to controls in the transmit waveform conditioner 220 and analog transmitter 215. The controller 205 can have multiple and concurrent modes of operation for improving specific measures of performance. For example, a power supply unit (PSU) control algorithm can be used to reduce the average power consumption of the power amplifier 240 while guaranteeing compliance to conducted spurious emissions requirements. This algorithm would continuously repeat the following procedure:

1. Obtain spectral measurement at Frequency Offset(s)
2. If (spectral measurement<Lower Threshold) then decrease PSU voltage
3. If (spectral measurement>Upper Threshold) then increase PSU voltage In the procedure above, the Frequency Offset(s) and the two thresholds (Upper and Lower), which provide hysteresis, are determined by the relevant regulatory and air interface standards for the transmitter 215. In another operating mode, the over-specification of the power amplifier 240 due to output power detector 230 inaccuracy can be avoided by having the controller 205 reduce the transmitter gain when spectral emissions are above maximum limits and the PSU is at maximum voltage. This algorithm would continuously repeat the following procedure:

1. Obtain spectral measurement at Frequency Offset(s)
2. If PSU voltage at maximum then
    if (spectral measurement>Threshold) then
        decrease transmitter gain A digital device such as an FPGA, ASIC, or microprocessor can be used to implement the digital spectrum analyzer 210 in one embodiment. Two example embodiments of a flexible and logic-efficient spectrum analyzer 210 are shown in FIGS. 5 and 6. The digital spectrum analyzer 210 can be constructed using several spectrum analysis channels 510, 515, 520, three of which are shown in FIG. 5. The multiple spectrum analysis channels 510, 515, 520 can be used to monitor spectral emissions at several frequency offsets simultaneously, which is beneficial for transmitters that must adhere to spectral emissions limits at several different frequencies as prescribed by relevant regulatory standards.

A spectrum analyzer channel, such as channel 510, may be implemented as a mixer-based, flexible spectrum analyzer as shown in FIG. 6. This architecture represents the digital-equivalent of a heterodyne-based spectrum analyzer which is often implemented in analog hardware in modern test equipment. The digital implementation of the analog spectrum analyzer architecture is found to be optimal for laying the foundations of an adaptive digital system for transceiver monitoring and control. An input multiplexer 610 allows various signals 615 from within the digital device to be measured. A multiplier-based mixer 620 with a reset-able and programmable numerically controlled oscillator (NCO) 625 is used to provide a frequency offset to the input digital signal 615. A resolution bandwidth filter stage 630 is used to limit spectral bandwidth of a subsequent power measurement. The resolution bandwidth filter 630 can be made programmable so that different spectral bandwidths can be configured for a specific measurement. The resolution bandwidth filter does not have stringent phase response requirements therefore it can be implemented using an efficient digital structure (such as for example an infinite impulse response (IIR) filter). A variable gain device 635 may be used to scale the digital signal to an appropriate level based on the dynamic range of a digital power detector 640. The digital power detector 640 is used to calculate the instantaneous power of the signal envelope, and an output filter 645 is used to perform power-averaging before a spectral power reading 650 is made available to various control or monitoring devices in the system. The flexibility of spectrum analyzer configuration (ie. input signal, frequency offset, resolution bandwidth, detector signal level) allows one instance of the spectrum analyzer channel to be shared, in a time-multiplexed manner, amongst various monitoring functions in the system. This implementation of a spectrum analyzer may be implemented with much less digital logic than more well-known FFT based methods.

Various embodiments of the transceiver system may enable fast and effective transmit signal optimization. Optimization of peak-envelope reduction algorithms by real-time measurement of transmit signal spectrum, and optimization of pre-distortion algorithms by real-time measurement of transmit signal spectrum may be performed.

Real-time transmitter control for increased transmitter efficiency may be obtained due to lower power supply consumption by real-time measurement of transmit signal spectrum. This may eliminate the need for over-specification of power amplifier by real-time measurement of transmit signal spectrum. Continuous improvement of receiver performance and monitoring during operation may be obtained by measuring receiver noise-floor. Spurious signals from receiver hardware as well as interferers in receiver input spectrum, receiver selectivity and receiver linearity may be enabled.

Flexible spectrum analyzer configuration is provided by a programmable input signal, frequency offset, resolution bandwidth, and dynamic range. In one embodiment, one structure may be shared amongst various optimization targets. Efficient spectrum analyzer implementation may include measurement of spectral power at one frequency offset and efficient digital logic implementation. Use of envelope power detection and relaxed phase response requirements of the resolution bandwidth filter may also provide resource-efficient realizations such as infinite-impulse response (IIR) filters. In a further embodiment, one structure may provide spectral analysis with increasingly narrower resolution bandwidth for the same amount of computational complexity, while preserving optimization methods that may be implemented. Over-specification of power amplifier may be avoided by measuring output spectral characteristics. Varying power supply voltage and/or amplifier gain enables the output frequency characteristic to be within an acceptable margin of a desired frequency mask. In further embodiments, the optimization methods may be applied to improve the performance, efficiency and size of signal transceivers in different fields such as, but not limited to, RF transmission, Hi-Fi audio, Hi-Fi video, optical transmission and, generally, in systems where high-quality of electrical/electro-mechanical/electro-optical/electro-magnetic signal transmission and reception has to be achieved.

In various embodiments, the system 100 may reduce transceiver inefficiency and over-specification by employing spectral analysis of signals within a system composed of a signal transmitter and receiver. The cost of transmitters may be reduced by digital waveform conditioning algorithms. These algorithms are enhanced by spectral analysis of internal digital waveforms and the transmitted output spectrum. Operating voltage and output power of the transmitter power amplifier may be optimized using spectral measurements of the output transmit signal using a feedback (or observation) receiver. In the main and feedback receivers, the digital spectrum analyzer can be used to detect unwanted interferers and measure performance of the receiver analog hardware. All this may be achieved by a resource-efficient digital spectrum analyzer architecture, which need not involve computationally expensive approaches such as fast Fourier transforms (also known as FFT), and an intelligent resource-managing controller paired with it. The controller intelligence may be provided by a finite state machine responsible for specifying the generic spectrum analyzer (SA) configuration for a given transceiver application. In further embodiments, general purpose computers or programmable logic arrays or other devices capable of performing the functions described may be used.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A transceiver for a cellular telephone network, the transceiver comprising:
    a transmitter configured to receive an input signal and provide a transmit signal according to the input signal, wherein the transmit signal is suitable for transmission;
    a power amplifier coupled to the transmitter and configured to:
        receive an analog output signal representative of the transmit signal from the transmitter; and
        produce an amplified output signal by amplifying the received analog output signal;
    a receiver configured to receive the amplified output signal;
    a spectral analyzer coupled to the receiver and configured to:
        perform a comparison between the input signal and the received amplified output signal;
        generate spectral power information based on the comparison, wherein the spectral power information comprises information about spectral power of the input signal and the received amplifier output signal with respect to frequency within a specified frequency range; and
    a controller coupled to the spectral analyzer and configured to:
        receive the spectral power information; and
        control transmitter gain as a function of the received spectral power information.

2. The transceiver of claim 1, further comprising a power detector coupled to the controller and configured to receive the amplified output signal and provide a signal representative of power.

3. The transceiver of claim 2, wherein the controller is further configured to control a power supply voltage coupled to the power amplifier.

4. The transceiver of claim 1, wherein the controller is further configured to reduce transmitter gain if spectral emissions are above a threshold.

5. The transmitter of claim 1, further comprising a waveform conditioning module configured to provide peak-envelope reduction and signal predistortion of the input signal, and wherein the controller is further configured to control the peak-envelope reduction and digital predistortion of the input signal responsive to the received spectral power information.

6. A method of transmitting a signal, the method comprising:
- receiving a signal to be transmitted;
- pre-distorting the signal as a function of transmitter gain;
- obtaining a feedback signal based on the transmitted pre-distorted signal;
- performing spectral analysis on the feedback signal, comprising measuring a magnitude of the feedback signal versus frequency over a specified frequency range;
- comparing the received signal to the feedback signal, and generate information about received spectral power according to the comparison and the spectral analysis, wherein the information comprises information about power of the received signal and the feedback signal with respect to frequency within the specified frequency range; and
- modifying pre-distortion of the received signal as a function of the spectral analysis and the information.

7. The method of claim 6 and further comprising measuring analog output power of the transmitter.

8. The method of claim 7 and further comprising controlling at least one of a supply voltage to a transmitter and gain of the transmitter.

9. A transceiver for a cellular telephone network, the transceiver comprising:
- a receiver configured to receive an input signal and provide an output signal suitable for processing by the network;
- a waveform conditioning module configured to provide impairment compensation and signal formatting for further processing by the network;
- a spectral analyzer coupled to the receiver and the waveform conditioning module, and configured to:
  - provide a spectral analysis of the input signal;
  - perform a comparison between the input signal and a received output; and
  - generate information about received spectral power according to the comparison, wherein the information comprises information about power of the input signal and the received output with respect to frequency within a specified frequency range; and
- a controller coupled to the spectral analyzer, and configured to control the receiver and the waveform conditioning module as a function of the spectral analysis and the information.

10. The transceiver of claim 9 wherein the receiver comprises adjustable gain control and filtering elements.

11. The transceiver of claim 10 wherein the waveform conditioning module comprises adjustable gain and filtering elements.

12. The transceiver of claim 11, wherein the controller is further configured to control the gain and filtering elements of the receiver and the waveform conditioning module based on spectral analyzer measurements and other transceiver measurements.

* * * * *